UNITED STATES PATENT OFFICE.

JAMES H. GRAVELL, OF PHILADELPHIA, PENNSYLVANIA.

CLEANING METALS AND PREVENTING THEM FROM CORRODING.

1,221,442.  Specification of Letters Patent.  Patented Apr. 3, 1917.

No Drawing.  Application filed December 26, 1916.  Serial No. 138,992.

*To all whom it may concern:*

Be it known that I, JAMES H. GRAVELL, a citizen of the United States, residing at Philadelphia, in the county of Philadelphia and State of Pennsylvania, have invented certain new and useful Improvements in Cleaning Metals and Preventing Them from Corroding, of which the following is a specification.

This invention relates to cleaning metals, especially steel, and its object is to clean steel so that it will not rust or metal so that it will not corrode. The invention will be described in connection with steel but its use is not limited to that metal.

Steel and iron are now cleaned by the action of various acids, such as sulfuric, hydrochloric and nitric. The acids are diluted with ten times their volume of water and the solution thus formed is held in large non-metallic tanks and kept at a boiling temperature. The work to be cleaned is placed in this boiling solution for about fifteen minutes. On removing the work which has been cleaned by the action of the solution, it is necessary to neutralize the acid solution remaining on the surface of the work by dipping the work into a bath of lime water, as otherwise the work would immediately rust. It is very difficult, however, to get rid of all of the acid even after dipping the work into the lime water and it is well known that steel or iron that has been subjected to the action of such an acid is more liable to rust than if it has not been so treated.

This rusting and this tendency to rust is decidedly objectionable from a commercial standpoint. I have discovered, however, that this objectionable feature of cleaning steel by a chemical bath can be entirely avoided by subjecting the steel to the action of hydrocalcium phosphate.

It has been proposed to use phosphoric acid for this purpose but that material is entirely too expensive for rough commercial work and its use has been restricted to fine classes of products, such as steel furniture and automobile bodies. The material I use, however, is very inexpensive and is not prohibited by its cost from being applied to rough castings, hot rolled steel and the like.

To make a chemical bath according to my invention, I use approximately seventeen pounds of hydrocalcium phosphate to ten gallons of water and raise the temperature of this bath to the boiling point and immerse the material to be cleaned in the bath for about fifteen minutes. All these proportions and the time I allow the bath to act on the work are approximate as the bath will act quicker if I make it stronger and the time taken to clean the work naturally depends on how corroded or dirty the work is.

Hydrocalcium phosphate is made commercially by treating calcium phosphate (in the form of bone-ash or some phosphate rock) in water with sulfuric acid to form hydrocalcium phosphate and calcium sulfate. The calcium sulfate precipitates and the hydrocalcium phosphate dissolves in the water. The precipitate is separated from the solution and the solution evaporated to a semi-liquid mass of hydrocalcium phosphate.

The reaction above referred to may be expressed as follows:

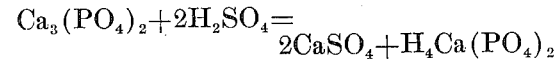
$$Ca_3(PO_4)_2 + 2H_2SO_4 = 2CaSO_4 + H_4Ca(PO_4)_2$$

It is immaterial to the success of my bath whether the hydrocalcium phosphate is added to water or whether the hydrocalcium phosphate is made in the water by adding to it calcium phosphate and an acid such as sulfuric acid, as the calcuim sulfate formed by the latter method does not in any way interfere with the action of the bath on the immersed metal. When I make a bath by the latter method, I use, for example, enough phosphoate rock or bone-ash to supply twenty-five pounds of calcium phosphate, and fourteen pounds of sulfuric acid to ten gallons of water.

In cases where transportation of acid liquid is objectionable, the acid may be replaced by an acid salt capable, when placed in water, of reacting with the calcium phosphate to form hydrocalcium phosphate. Sodium acid sulfate is a good example of such an acid salt and it reacts with calcium phosphate, in an aqueous solution as follows:

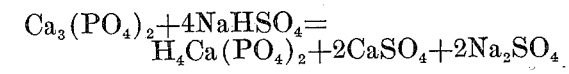
$$Ca_3(PO_4)_2 + 4NaHSO_4 = H_4Ca(PO_4)_2 + 2CaSO_4 + 2Na_2SO_4$$

As calcium phosphate and sodium acid sulfate are dry substances and have no action on each other when not in contact with water, they may be mixed together to form a dry admixture which can be stored until required for use or may be conveniently transported to where the bath is required, without danger of leaking or evaporation.

My bath acts in a similar way to the well known sulfuric acid pickle by removing scale, rust, corrosion and the like from the surface of steel and iron, but has the distinct advantage over the sulfuric acid pickle in that it does not cause the metal to subsequently rust. The work may be withdrawn from my solution or bath and allowed to drain and dry and need not be subjected to the action of lime to neutralize the remaining acid on the surface. The work treated by my bath and then allowed to drain and dry is practically rust-proof if kept indoors. The surface, however, remains sticky for some time which for some work is objectionable. This can be remedied, however, by dipping in a second bath similar to the first, except that it contains about five times as much water, in other words, in a weak solution of hydrocalcium phosphate. The surface now will dry very quickly and be free from stickiness.

When my bath acts on iron or steel for a short time, such as fifteen minutes, it has a cleaning action as I have already described; but when it is allowed to act on the work for a much longer time, say several hours, it has the peculiar and meritorious property of depositing on the surface of the iron or steel a coating of substantial thickness, firmly attached to the metal. I have found that material on which this coating has been formed by my bath is practically rust-proof even when exposed to the weather.

This coating is a medium gray in color but can be made a very dark gray or nearly black by adding manganese dioxid to my bath in about the proportion of one pound of manganese dioxid to every ten pounds of hydrocalcium phosphate used. As manganese dioxid is a dry powder and has no action on either dry calcium phosphate or dry sodium acid sulfate, it may be added to the dry admixture of these two materials which I have already described.

Hydrocalcium phosphate contains calcium and it may well be that this calcium operates to oppose the solution in the bath of phosphate of iron formed on the work and so promotes the formation of the coating to which reference has been made.

I am familiar with the patent, British 8667 of 1906, issued to T. W. Coslett which describes a method of producing a coating with phosphoric acid and I do not wish to claim anything disclosed by him but my bath is much less costly to make and has the decided advantage that it does not have to be evaporated to one-seventh of its volume as is the case with Coslett—in fact I do not have to evaporate my bath to any noticeable extent to produce my coating. Another advantage of my bath over that of Coslett is, that my bath both cleans and forms a coating, whereas Coslett's will not clean but only forms a coating.

I do not broadly claim herein the described method in which hydrocalcium phosphate is used, nor a bath containing calcium phosphate, sulfuric acid and water, for those matters are the subject of my application, Serial No. 131,394, filed November 15th, 1916.

What I claim is:

1. A bath for cleaning metal and preventing it from corroding, consisting of an admixture of calcium phosphate, an acid salt capable of reacting with the said calcium phosphate to form hydrocalcium phosphate, and water.

2. A bath for cleaning metal and preventing it from corroding consisting of an admixture of calcium phosphate, sodium acid sulfate, and water.

3. The method of cleaning steel and iron and preventing it from rusting, which consists in treating the metal with an admixture of calcium phosphate, sodium acid sulfate and water.

4. An ingredient for a bath for cleaning steel and iron and preventing it from rusting, consisting of an admixture of calcium phosphate and an acid salt capable, in the presence of water, of reacting with the said calcium phosphate to form hydrocalcium phosphate.

5. An ingredient for a bath for cleaning steel and iron and preventing it from rusting consisting of an admixture of calcium phosphate and sodium acid sulfate.

6. An ingredient for a bath for cleaning steel and iron and preventing it from rusting consisting of an admixture of calcium phosphate, sodium acid sulfate, and manganese dioxid.

JAMES H. GRAVELL.